United States Patent
Leathers

[15] 3,656,058
[45] Apr. 11, 1972

[54] ENVIRONMENTAL TEST BED ASSEMBLY FOR MINIATURE ELECTRONIC COMPONENTS

[72] Inventor: Claude L. Leathers, 1364 Wylie Way, San Jose, Calif. 95130
[22] Filed: July 2, 1969
[21] Appl. No.: 838,464

[52] U.S. Cl. .................................324/158 F, 317/101 DH
[51] Int. Cl. ..................................G01r 31/22, H02b 1/04
[58] Field of Search.................324/158, 158 F, 73 PC, 73; 317/101, 101 A, 101 B, 101 C, 101 CB, 101 DH; 339/17 R, 17 LM, 17 M, 17 L, 17 C, 17 CF, 17 LC, 174, 154

[56] References Cited

UNITED STATES PATENTS

| | | |
|---|---|---|
| 3,496,514 | 2/1970 | Gallentine............................339/17 L |
| 2,701,346 | 2/1955 | Powell..................................339/17 |
| 2,877,388 | 3/1959 | Reid, Jr. et al......................317/101 |
| 3,408,565 | 10/1968 | Frick et al...........................324/158 |

FOREIGN PATENTS OR APPLICATIONS 1,143,559  6/1961  Germany............................339/17 L Primary Examiner—Rudolph V. Rolinec
Assistant Examiner—Ernest F. Karlsen
Attorney—Flehr, Hohbach, Test, Albritton & Herbert

[57] ABSTRACT

A test bed assembly for use in conjunction with an environmental test oven employs a readily removable tray assembly which carries support or mounting boards arranged in spaced parallel relation. The mounting boards are connected at their bottoms to ride upon electrically active rods and, at their upper edge, are arranged to carry readily removable test sockets.

4 Claims, 5 Drawing Figures

INVENTOR.
Claude L. Leathers
BY Flehr, Hohbach, Test,
Albritton & Herbert
Attorneys

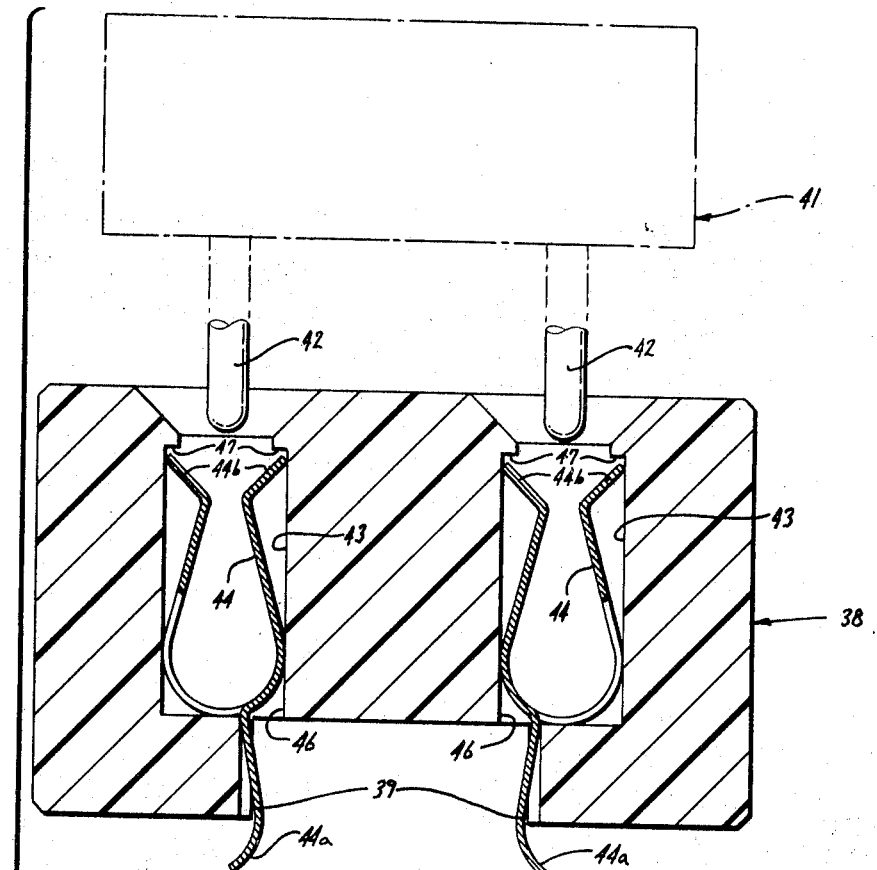
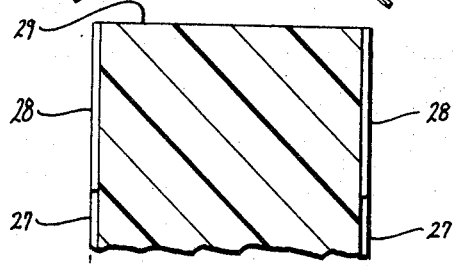
Fig. 4
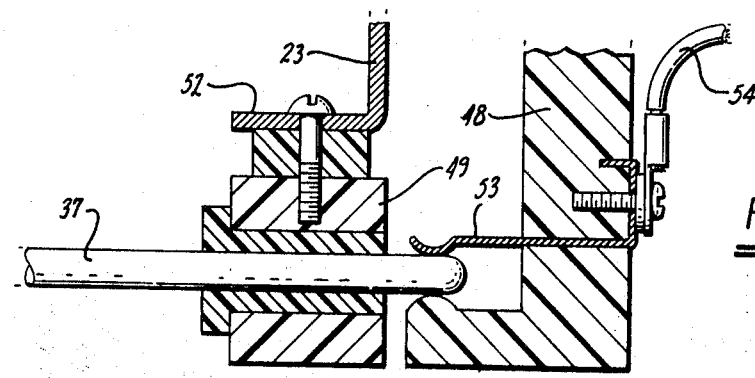
Fig. 5
INVENTOR.
Claude L. Leathers 3,656,058

ENVIRONMENTAL TEST BED ASSEMBLY FOR MINIATURE ELECTRONIC COMPONENTS

BACKGROUND OF THE INVENTION

This invention pertains to a test bed assembly of a type particularly useful in conjunction with an environmental testing oven of a type wherein a number of electric units such as miniature electronic components can be carried into the oven for testing the performance of the units or components under various environmental conditions.

Heretofore relatively small numbers of electronic components could be electrically operated within a testing oven at the same time due to the considerable difficulty involved in making large numbers of connections to each of the components. Heretofore considerable difficulty, expense, and waste has been involved in providing such testing ovens due to the awkwardness of making such connections.

OBJECTS

It is a general object of the invention to provide a test bed assembly wherein large numbers of electric units to be tested can be readily connected and operated with substantial simplicity.

It is another object of the invention to provide a test bed assembly of the type described wherein considerably greater numbers of electric units can be tested simultaneously without need for elaborate and expensive connections.

SUMMARY OF THE INVENTION

For use in an environmental testing oven or like enclosure a readily removable tray assembly has been provided which is adapted to carry electric units, such as miniature electronic components, into the oven or other enclosure for testing the performance of such units under various environmental conditions. The tray assembly includes a number of mounting boards arranged in spaced parallel relation. The boards each have two pairs of spaced apart edges and means engaging the boards to support them in their parallel relationship. Discrete electrically conductive means have been provided to be carried by each of the boards to terminate at one edge thereof. A test socket fixture is carried on the edge of each of the boards in electrical connection to the conductive means mentioned above and the test socket fixture further includes means to receive an electric unit plugged into it for testing. Electrically conductive means are disposed in common with each of the boards at another edge thereof for energizing the electric units carried by the test socket fixtures.

BRIEF DESCRIPTION OF THE DRAWING

FIG. 4 is an enlarged detail side elevation section view demonstrating the attachment of the exploded portions shown in FIG. 3; and FIG. 5 is an enlarged detail side elevation section view showing means for connecting the inner ends of rods 37 to conductors carried by the rear wall 48 of the oven.

DESCRIPTION OF THE PREFERRED EMBODIMENT

Figure 1:
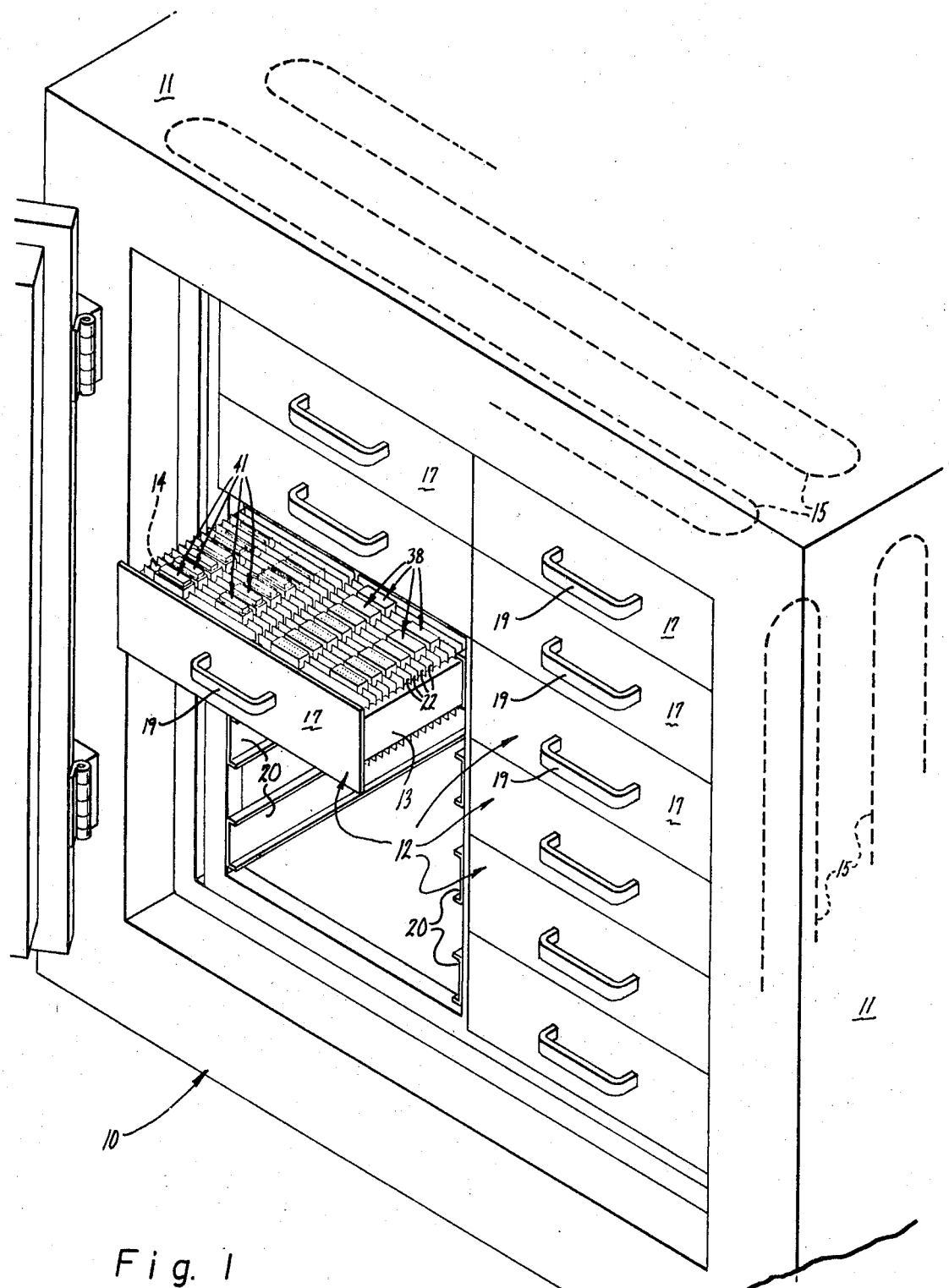
FIG. 1 is a perspective view of an environmental test bed assembly, according to the invention.
Figure 2:
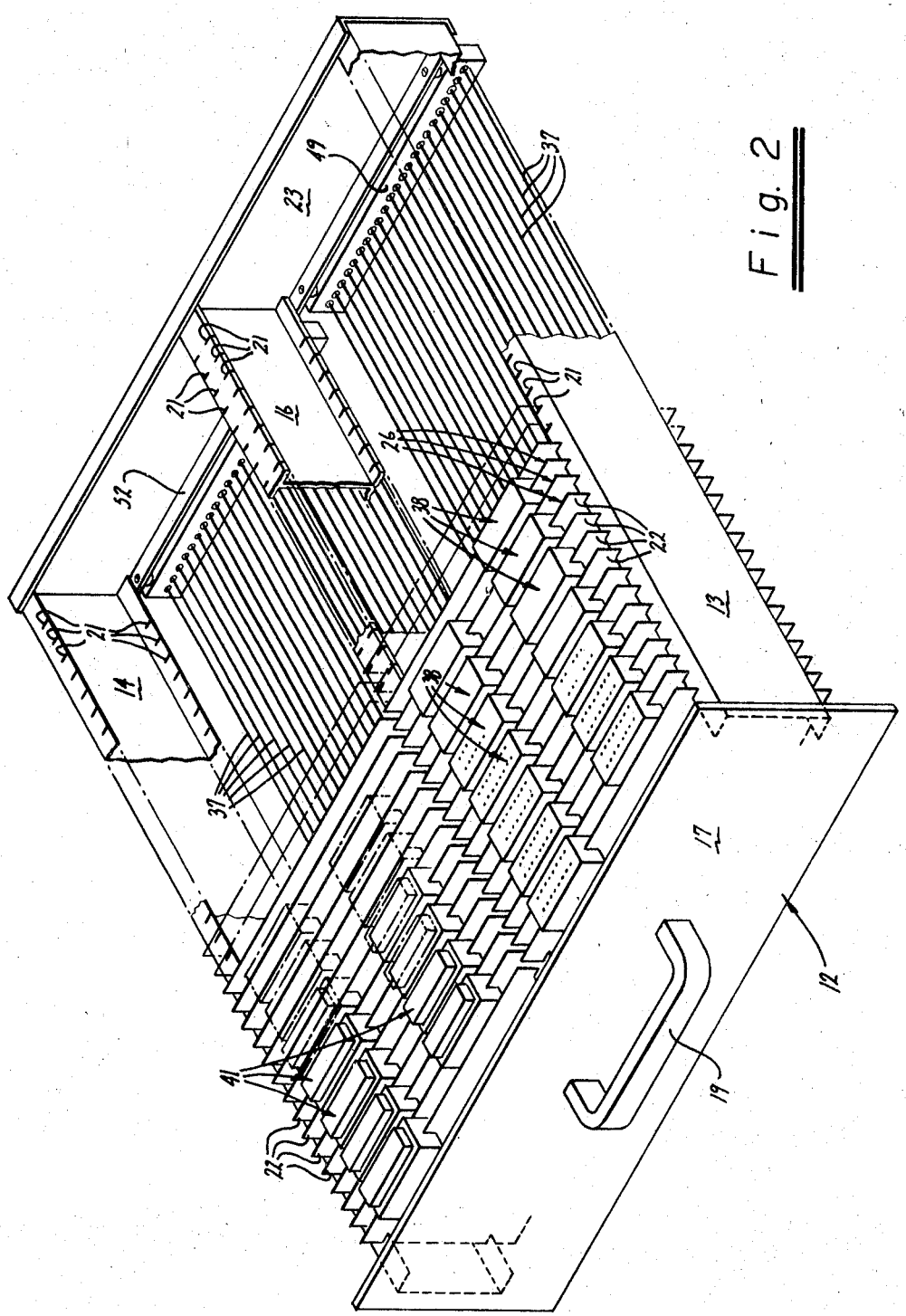
FIG. 2 is a perspective view, in enlarged detail, showing a tray assembly, according to the invention.

Having in mind the above general description, an environmental test oven 10 is schematically shown comprised of four walls forming an enclosure 11 arranged to contain a number of readily removable tray assemblies 12 which may be easily withdrawn from a storage position within enclosure 11.

The test oven 10, in general, has conventional features providing environmental control such as employed in the usual types of equipment, for regulating temperature and other environmental conditions within the oven 10. Schematically heating coils 15 are shown within enclosure 11.

Each tray assembly 12 includes a pair of spaced side rails or frame members 13, 14 and an intermediate dual frame member 16. A front closure panel 17 carries a handle 19 forming a drawer pull for withdrawing assembly 12 from oven 10. The front panel 17 is secured at its ends in suitable style, as by welding, to the side rails 13, 14 as well as also being suitably secured, as by welding, to the intermediate dual frame member 16. Thus rigidity is imparted to the framework of the tray assembly 12 whereby it may be readily withdrawn from oven 10.

Rails 13, 14 ride on ways 20 of conventional construction formed within oven 10.

Each of rails 13, 14 includes uniformly spaced slots or notches 21 formed along their in-board edges and adapted to receive the side edge of a mounting board 22. The opposite edges of mounting boards 22 are also engaged in similar notches formed on both sides of the intermediate dual frame member 16. Member 16, may, for example, be formed as a box beam construction or formed in an "I" beam configuration.

The side rails 13, 14 are held in substantially parallel relation by means of a spacer bar 23 of suitable rigid material such as sheet steel, or the like providing a rear panel. The ends of rails 13, 14 and member 16 are all secured to spacer bar 23 suitably by means of welding or otherwise.

Having in mind the foregoing tray construction comprised of notched side members joined at each end by front and rear panels and including an intermediate dual frame member 16, also formed with notches spaced at the same interval as the spacing between the notches 21 formed in each of the side rails 13, 14, a number of mounting board assemblies 26 are formed and arranged in spaced parallel relation merely by disposing the edges of the mounting board assemblies 26 in the notches 21.

Each mounting board assembly comprises a substrate of insulative material such as the mounting board 22, for example, of ceramic or steatite. Each mounting board 22 is formed with a plurality of conductive paths formed on at least one face of the substrate material. Preferably these conductive paths 27 are placed upon substrate 22 using printed circuit techniques of conventional style, and are disposed on both faces of each board 22.

Figure 3:
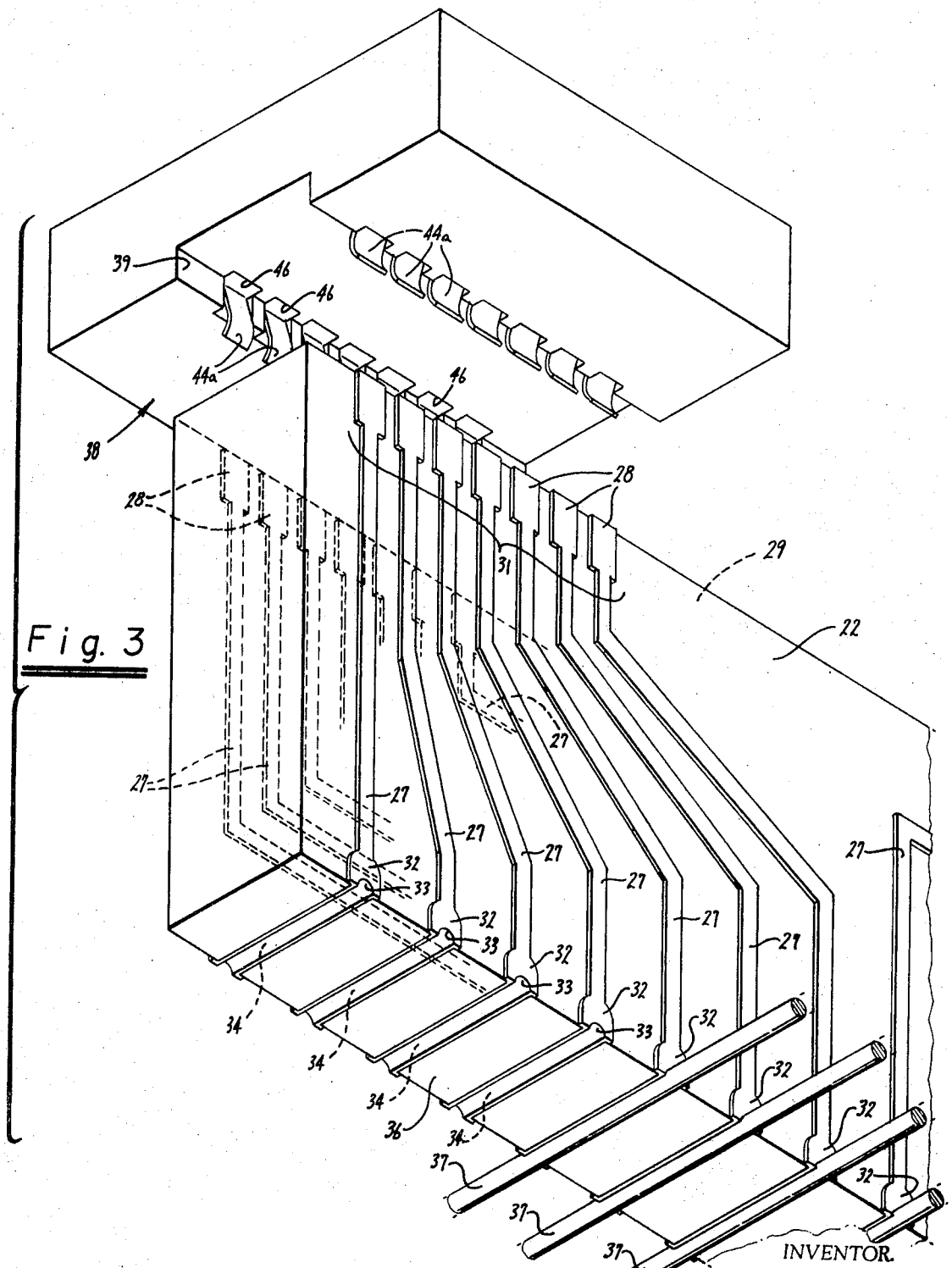
FIG. 3 is a partially exploded view shown from beneath, in enlarged detail, of a portion of the construction shown in FIGS. 1 and 2.

An end 28 of each path 27 terminates along the edge margin of a common one of the edges, such as the upper edge 29 (as viewed in FIG. 3) of mounting board 22. The ends 28 are all closely distributed along a limited portion 31 of edge 29 so as generally not to utilize more than half the length of edge 29.

The lower edge 36 of each mounting board 22 includes a number of grooves 34 adapted to receive therein conductive rods 37. Each of the paths 27 formed on the face of mounting board 22 terminates at its lower end 32 in an enlarged portion including a notch 33 dimensioned substantially the size of the grooves 34 formed thereat so as to accommodate the lodging of a rod 37 in one of the associated grooves.

As thus arranged it will be readily evident that each conductive rod 37 serves to couple a number of printed circuit paths 27 in parallel to a common electrical source. By dipping the lower edge 36 of all boards 22 into a bath of solder material, the conductive rods 37 can be at once securely attached to the accumulation of boards 22.

A test socket fixture 38 is carried on the upper edge 29 of board 22 as now to be described. Each test socket fixture 38 includes an elongated groove 39 adapted to receive and snugly engage the upper edge margin of an associated one of the boards 22. Fixture 38 includes socket means adapted to receive an electrical unit 41 such as a miniaturized electronic component on the order of, for example, an integrated circuit provided with a number of connections, such as prongs 42.

Thus fixture 38 includes a number of socket openings 43, arranged, for example, in two parallel lines, and each socket opening 43 includes electrically conductive prong engaging means such as of resilient copper or other conductive connecting elements 44. Elements 44 are each provided with downwardly depending electrical contact portions 44a disposed to depend downwardly through access openings 46 and, as thus arranged, flank the groove 39 at the side edges thereof.

Thus, discrete conductive elements 44a are electrically arranged to be coupled to respective ones of the prongs 42 of a unit 41 to be tested. This may be accomplished merely by disposing the test fixture 38 onto the top edge 29 of a board 22 in a manner to align the downwardly depending contact portions 44a with the upper ends 28 of paths 27 formed thereon. Preferably the fixture should provide a snug fit with the edge of the board.

From the foregoing description it will be readily apparent that a mounting board assembly has been provided which is extremely convenient and permits the formation of a great number of electrical connections to even the very small types of connections employed with integrated circuit types of devices and the like. The mounting board assembly comprises the insulating substrate carrying its printed circuit leads thereon while rods form electrically parallel connections to a large number of leads common to each of the electrical units being tested. In order to provide a considerably compacted tray assembly, the fixtures are alternately staggered throughout the array by means of merely reversing the mounting boards as described above. Thus, by locating all of the upper ends 28 in a limited portion 31 of the edge 29 of a given board and restricting the extent of portion 31 to less than one-half the length of the edge of the board it is possible to alternate the location of fixtures throughout the array and thereby obtain a considerable saving in space.

It is further apparent that the conductive paths 27 are preferably formed in two groups respectively formed on both the front and back faces of the substrate or mounting board 22. The upper ends 28 of one group of such paths 27 is disposed as above described at the limited region 31 while the upper ends 28 of the other group of paths 27 carried on the opposite face of board 22 is disposed directly opposite the limited margin portion 31 referred to above.

In this way the above referred to manipulation of fixtures 38 can be readily achieved merely by properly orienting the limited margin portion 31 to one side or the other.

In assembling the socket fixtures 38 with the connecting elements 44 disposed in openings 43, it is readily evident that by virtue of the outwardly formed ends 44b the elements 44 will be retained in place, against any tendency to be withdrawn upwardly, by virtue of the slight lip 47 formed at the edge of each opening 43. On the other hand insertion of elements 44 is readily achieved by merely forcing them into openings 43 while compressing the two leaves thereof together.

Means for selectively energizing various ones of the conductive rods 37 may be provided on the rear wall 48 of oven 10 whereby connection is properly made merely by inserting the tray assembly 12 fully into its appropriate position.

Thus the inner ends of rods 37 are held in fixed positions with respect to each other by means of an insulative support bar or spacer 49 formed with a number of rod openings 51 extending therethrough and adapted each to carry the inner end of one of rods 37 in fixed relation with respect to the spacer bar 23. Bar 49 is carried by suitable means such as screws spaced, as desired, from the lower inwardly turned lip 52 of bar 23.

Carried from the inner surface of the rear wall of oven 10 a number of suitable flexible contacts 53 are arranged in alignment with the inner ends of rods 37 whereby full insertion of tray assembly 12 serves to cause the inner ends of rods 37 to engage such contacts 53. Contacts 53 are electrically selected to be energized by means of conductors 54.

Before operating testing oven 10 each of the tray assemblies 12 is loaded with its capacity of electric units 41 to be tested. The tray assemblies 12 are then slidably inserted into their respective positions within oven 10, being careful to insure that the inner ends of each of the conductive rods 37 engages its associated electric contact 53, as carried by the rear wall of oven 10. Subsequently any selected combination of rods 37 may be suitably electrically energized by means (not shown) while the environment within the oven 10 is brought to the test conditions, as by energizing heater coils 15.

I claim:

1. In a readily removable tray assembly adapted to be disposed within an environmental testing oven to carry electric units into the oven for testing the performance of such units under various environmental conditions, said tray assembly comprising a number of mounting boards arranged in spaced parallel relation, said boards each having first and second pairs of spaced apart edges, means supporting said boards in their parallel spaced relation, discrete electrically conductive means carried by each of said boards and terminating at one edge thereof, a test fixture carried on the edge of each of said boards in electrical connection to said conductive means and having means to receive an electric unit carried by said test fixture for testing said unit, and means common to each of said boards and electrically coupled to said discrete conductive means for energizing said electric units carried by said fixtures, said discrete conductive means comprising a number of conductive paths formed on each of said boards to extend from said one edge thereof to another edge thereof, said one edge of the boards lying substantially in a common plane, and wherein the fixtures carried by said one edges of adjacent ones of said boards are respectively laterally offset with respect to each other to diminish the spacing required between the planes of adjacent boards.

2. In a tray assembly according to claim 1 further wherein the length of the portion of each of said one edges occupied by one of said fixtures is less than one-half said length.

3. In a tray assembly according to claim 1 further wherein said fixtures include a slot formed therein to embrace said one edge of one of said boards, and discrete electrical connector elements carried by said fixture for receiving protruding terminals therein of one of said units, said connector elements being disposed to flank said slot and serving to resiliently engage said discrete electrically conductive means of said one board.

4. In a tray assembly according to claim 1 further wherein said fixtures include a relieved portion formed therein to overhang said one edge of one of said boards and confront same, and discrete electrical connecting means carried by said fixture on a portion of said relieved portion confronting the edge margin of a face of said board, the last named discrete connecting means individually contacting associated ones of said paths.

* * * * *